(12) United States Patent
Nishikawa et al.

(10) Patent No.: US 10,899,327 B2
(45) Date of Patent: Jan. 26, 2021

(54) ELECTRIC BRAKE DEVICE

(71) Applicant: NTN CORPORATION, Osaka (JP)

(72) Inventors: Akiyoshi Nishikawa, Iwata (JP); Tatsuya Yamasaki, Iwata (JP)

(73) Assignee: NTN CORPORATION, Osaka (JP)

(*) Notice: Subject to any disclaimer, the term of this patent is extended or adjusted under 35 U.S.C. 154(b) by 266 days.

(21) Appl. No.: 15/915,845

(22) Filed: Mar. 8, 2018

(65) Prior Publication Data

US 2018/0194333 A1 Jul. 12, 2018

Related U.S. Application Data

(63) Continuation of application No. PCT/JP2016/075880, filed on Sep. 2, 2016.

(30) Foreign Application Priority Data

Sep. 9, 2015 (JP) ................................. 2015-177242
Sep. 14, 2015 (JP) ................................. 2015-180302

(51) Int. Cl.
*B60T 8/172* (2006.01)
*B60T 13/74* (2006.01)
(Continued)

(52) U.S. Cl.
CPC .............. *B60T 8/172* (2013.01); *B60T 7/042* (2013.01); *B60T 8/00* (2013.01); *B60T 8/171* (2013.01);
(Continued)

(58) Field of Classification Search
None
See application file for complete search history.

(56) References Cited

U.S. PATENT DOCUMENTS 6,250,436 B1   6/2001  Oikawa et al.
6,332,654 B1 * 12/2001  Yano ...................... B60T 7/122
                                                              188/353
(Continued)

FOREIGN PATENT DOCUMENTS

DE    197 36 997        3/1999
EP    1 186 495 A1      3/2002
(Continued)

OTHER PUBLICATIONS

English Translation by WIPO of the International Preliminary Report on Patentability dated Mar. 22, 2018, in corresponding International Patent Application No. PCT/JP2016/075880, 6 pgs.
(Continued)

*Primary Examiner* — Jonathan M Dager
*Assistant Examiner* — Garrett F Evans

(57) ABSTRACT

Provided is an electric brake device capable of adjusting a clearance without making a driver feel discomfort, in a vehicle equipped with the electric brake device. A control device (2) of this electric brake device (DB) includes: a brake operation amount detector (24) to detect an operation amount to a brake operation member (27) of the vehicle; and an operation record flag storage unit (19) to store an operation record flag indicating a record of a latest operation performed by the driver to the brake operation member (27), on the basis of the operation amount detected by the brake operation amount detector (24). The control device (2) further includes a target clearance determination unit (17) to determine a target clearance with reference to the operation record flag stored in the operation record flag storage unit (19).

7 Claims, 10 Drawing Sheets

(51) Int. Cl.
  *B60T 8/00* (2006.01)
  *B60T 7/04* (2006.01)
  *B60T 8/171* (2006.01)
  *B60T 8/32* (2006.01)

(52) U.S. Cl.
  CPC ............... *B60T 8/32* (2013.01); *B60T 13/74* (2013.01); *B60T 13/741* (2013.01); *B60T 2201/12* (2013.01); *B60T 2220/04* (2013.01)

(56) References Cited

U.S. PATENT DOCUMENTS

| | | |
|---|---|---|
| 6,496,768 B2 | 12/2002 | Yamamoto |
| 6,646,308 B2 | 11/2003 | So et al. |
| 8,239,100 B2 | 8/2012 | Ueno et al. |
| 9,915,308 B2 | 3/2018 | Masuda |
| 2002/0026272 A1 | 2/2002 | Yamamoto |
| 2002/0027387 A1 | 3/2002 | Kubota |
| 2003/0062228 A1 | 4/2003 | Ichinose et al. |
| 2008/0059023 A1 | 3/2008 | Ueno et al. |
| 2014/0069750 A1* | 3/2014 | Nohira ............... F16D 65/62 188/71.8 |
| 2016/0208871 A1 | 7/2016 | Masuda |

FOREIGN PATENT DOCUMENTS

| | | |
|---|---|---|
| EP | 1 894 804 A2 | 3/2008 |
| EP | 3 042 814 A1 | 7/2016 |
| JP | 11-165620 | 6/1999 |
| JP | 2000-46082 | 2/2000 |
| JP | 2002-67906 | 3/2002 |
| JP | 4166336 | 8/2008 |
| JP | 2009-12655 | 1/2009 |
| JP | 2010-83282 | 4/2010 |
| JP | 2010-203561 | 9/2010 |
| JP | 2010-215188 | 9/2010 |
| JP | 2012-236492 | 12/2012 |
| WO | WO 2015/033863 A1 | 3/2015 |

OTHER PUBLICATIONS

Chinese Office Action dated Nov. 12, 2019 in corresponding Chinese Patent Application No. 201680052022.X.
Extended European Search Report dated Mar. 25, 2019 in corresponding European Patent Application No. 16844287.9 (7 pages).
International Search Report dated Oct. 11, 2016 in corresponding International Patent Application No. PCT/JP2016/075880.
Office Action, dated Aug. 20, 2020, in corresponding Chinese Application No. 201680052022.X (17 pp.).

* cited by examiner

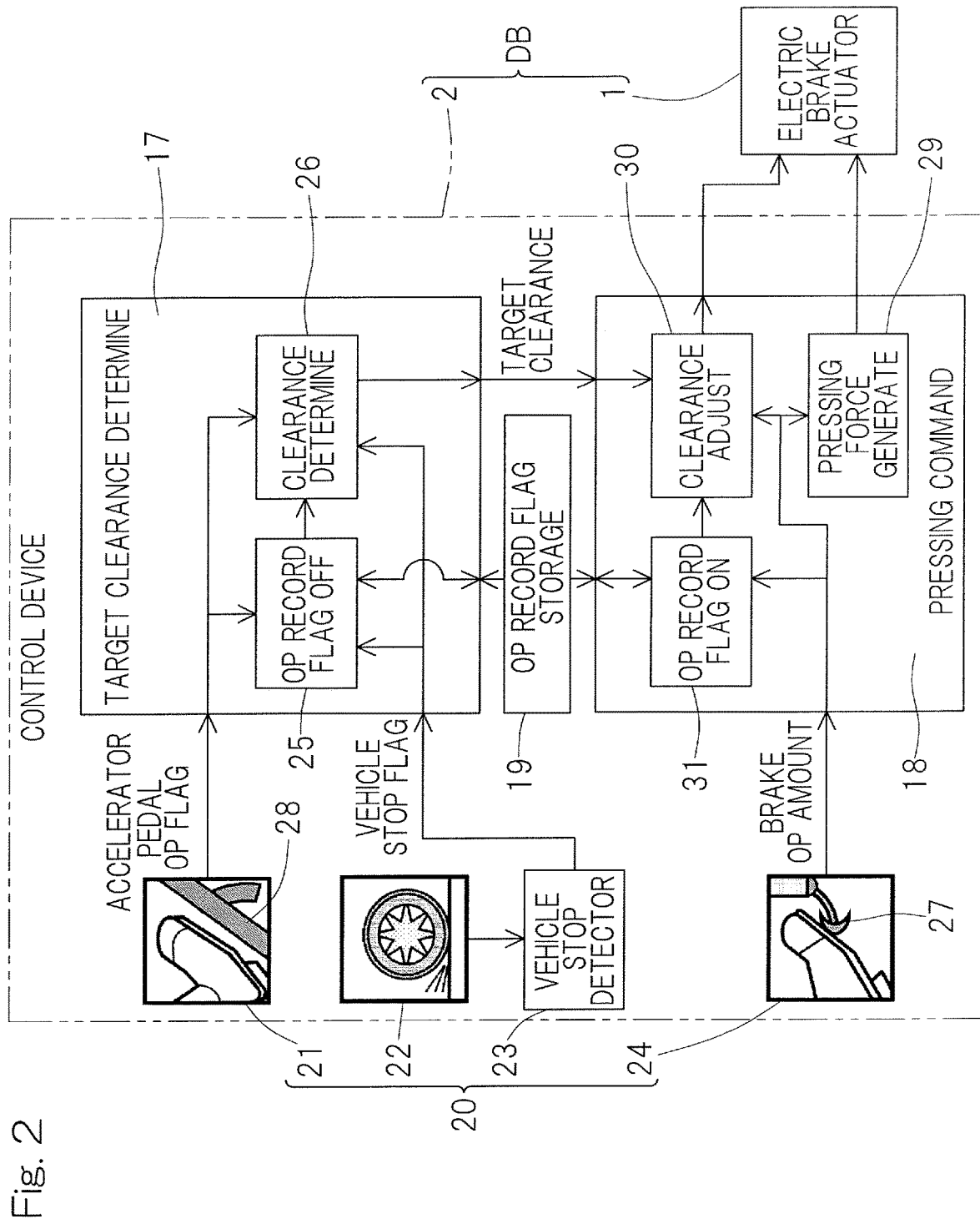

Fig. 8
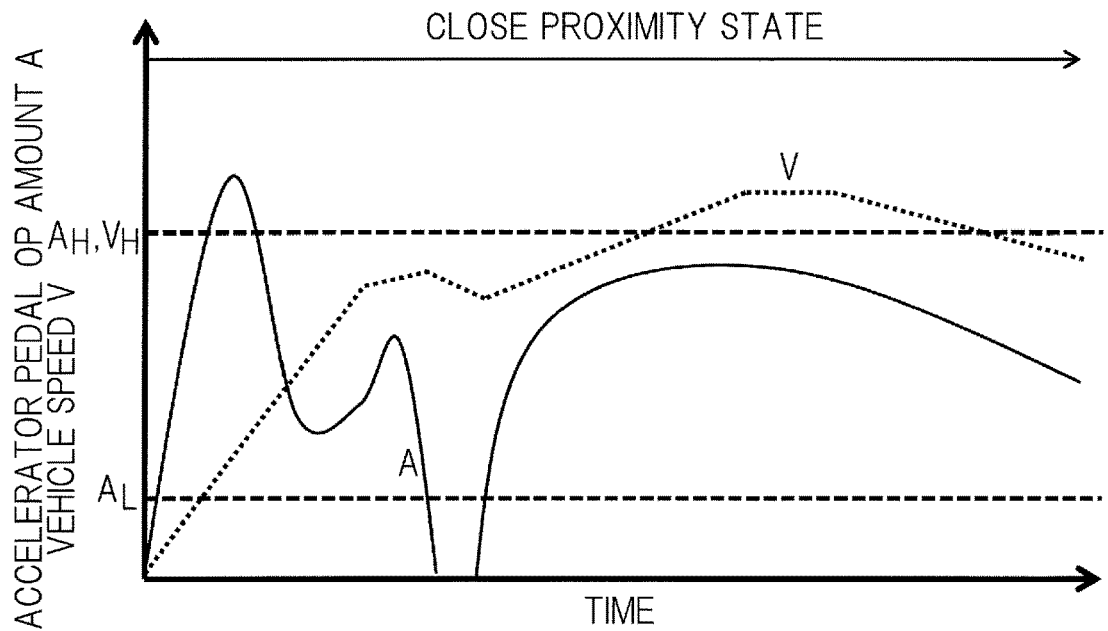
Fig. 9  DETERMINATION OF "CLEARANCE OPEN" WHEN CLEARANCE IS IN CLOSE PROXIMITY STATE
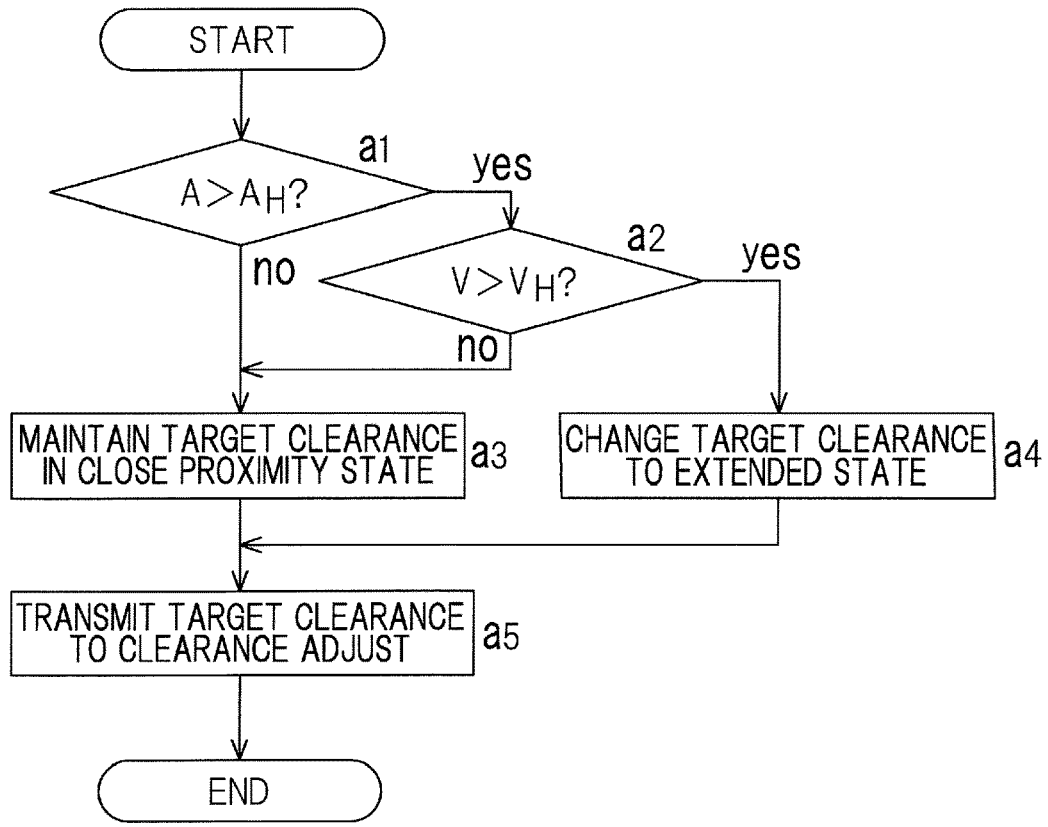

Fig. 10  DETERMINATION OF "CLEARANCE CLOSE" WHEN CLEARANCE IS IN EXTENDED STATE
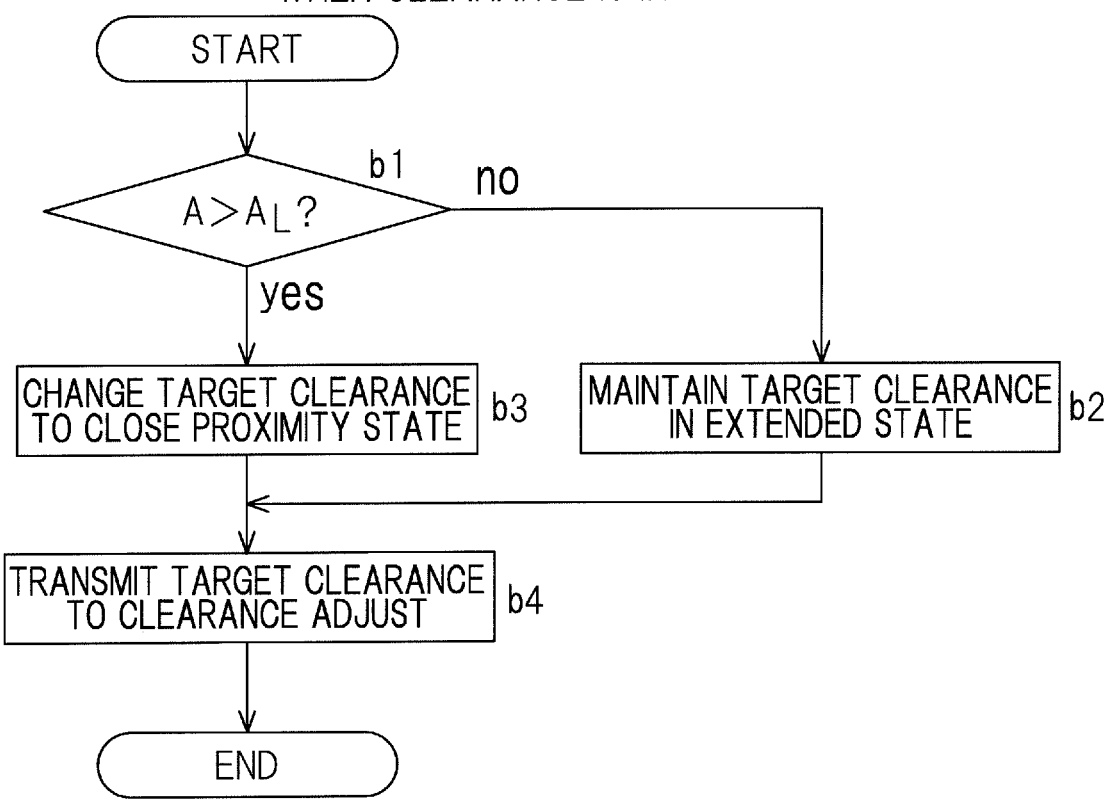
Fig. 11
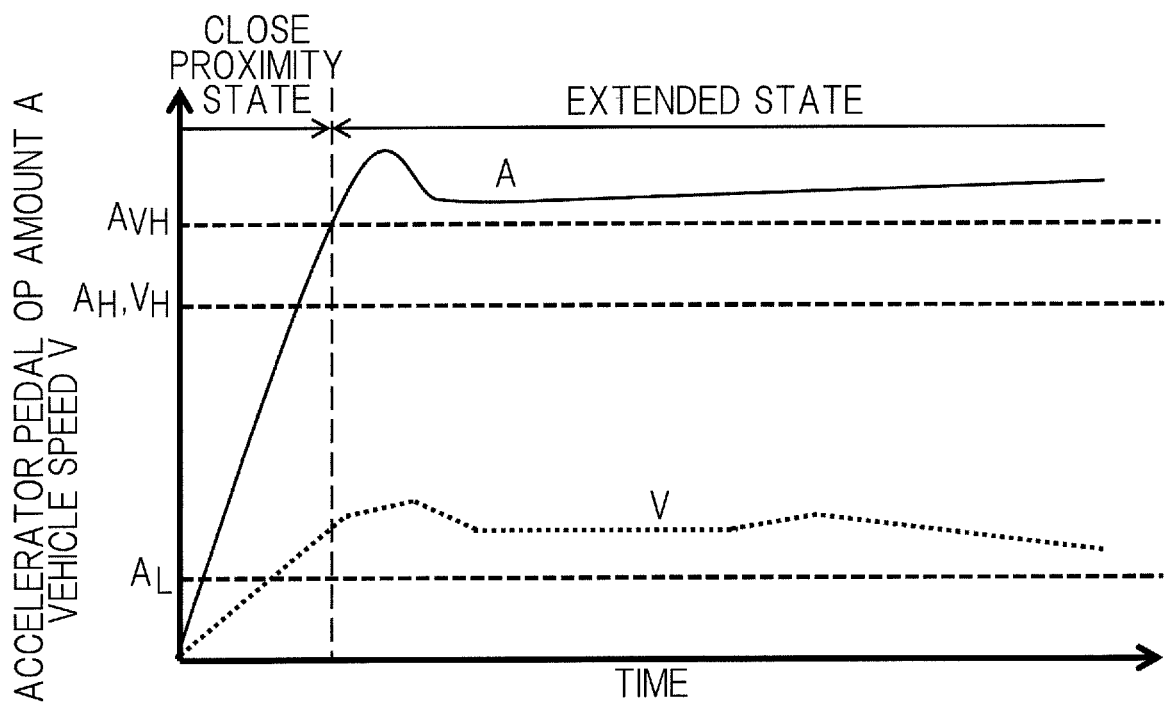

ELECTRIC BRAKE DEVICE

CROSS REFERENCE TO THE RELATED APPLICATION

This application is a continuation application, under 35 U.S.C. § 111(a), of international application No. PCT/JP2016/075880, filed Sep. 2, 2016, which claims Convention priority to Japanese patent application No. 2015-177242, filed Sep. 9, 2015, and Japanese patent application No. 2015-180302, filed Sep. 14, 2015, the entire disclosures of which are herein incorporated by reference as a part of this application.

BACKGROUND OF THE INVENTION

Field of the Invention

The present invention relates to an electric brake device, and to a technique of adjusting a clearance without making a driver feel discomfort in a vehicle equipped with the electric brake device.

Description of Related Art

An electric brake is configured to be able to freely determine a clearance between a brake disc and a brake pad. As for a vehicle equipped with such an electric brake, various proposals have been made regarding: a control method for maintaining a target clearance; a method for reducing discomfort of a driver during the control; and a method for determining a clearance in accordance with the driver's operating condition and the vehicle condition (Patent Documents 1 to 3).

Patent Document 1 discloses a technique for maintaining a clearance at a target size even when condition change occurs due to wear of a disc, or the like. The reason for maintaining the clearance at the target size is to prevent an idle running time from when an electric brake starts an operation for pressing to when a braking force arises, from being increased due to wear of the disc. The technique disclosed in Patent Document 1 is directed to electric brakes for aircrafts, but is also applicable to electric brakes for automobiles.

Patent Document 2 discloses a technique for determining an operation speed of an actuator when a clearance is reduced to make a disc and a pad come into contact with each other (to eliminate the clearance) for the purpose of generating a pressing force. Patent Document 2 points out that noise occurs when the actuator is operated, and this noise makes a driver feel discomfort. According to the proposal of Patent Document 2, the actuator is operated at a high speed while placing prime importance on responsiveness, during high-speed traveling in which running noise is loud, whereas the actuator is operated at a low-speed during low-speed traveling in which the noise of the actuator is offensive to the ears. Although the clearance should be optimally adjusted for control of vehicle behavior, it is obvious from the above patent documents that the noise generated when the clearance is adjusted makes the driver feel discomfort.

Patent Document 3 points out an initial response delay that occurs when a clearance is eliminated, and noise generation at that time. Patent Document 3 discloses a clearance determination method for enhancing initial responsiveness, and reducing noise caused by brake operation. Specifically, when a driver releases an accelerator pedal during traveling, a brake pad stands by with a minute clearance, and when the vehicle is in the stop state, the brake pad is maintained at a position where the clearance is zero. When a brake pedal is operated, control is performed so as to generate a pressing force according to the operation.

In a conventional structure capable of adjusting a clearance with a brake using a hydraulic system, for example, the hydraulic system is caused to generate negative pressure when dragging of the brake is not necessary, and the clearance is increased to reduce dragging of the brake during traveling (Patent Document 4). Meanwhile, regarding adjustment of a clearance, Patent Document 5 indicates that it is difficult to maintain a brake pad at a neutral position because the hydraulic system has different properties between under increasing pressure and under decreasing pressure. Therefore, generally, a clearance is held during traveling, and the clearance is eliminated during braking, thereby enhancing response performance. However, even when response performance is enhanced, noise makes a driver feel discomfort, as described above.

RELATED DOCUMENT

Patent Document

[Patent Document 1] JP Laid-open Patent Publication No. 2010-203561
[Patent Document 2] JP Laid-open Patent Publication No. 2002-67906
[Patent Document 3] Japanese Patent No. 4166336
[Patent Document 4] JP Laid-open Patent Publication No. 2010-215188
[Patent Document 5] JP Laid-open Patent Publication No. H11-165620

SUMMARY OF THE INVENTION

A driver is likely to feel discomfort when actual vehicle behavior in response to the driver's operation does not coincide with vehicle behavior expected by the driver, and when operation noise is generated at a time when the driver does not expect the noise generation. Regarding the operation noise, even small noise is likely to make the driver feel discomfort if the noise is generated at an unexpected time. Meanwhile, in the control method that focuses only on the operation condition and the vehicle condition as disclosed in Patent Document 3, if the vehicle is stopped while being in the inertial traveling state, a motion to eliminate a clearance occurs at a time when stop determination is made. This may make the driver feel discomfort. In view of these, the inventor of the present invention has considered that it is necessary to adopt a control method that focuses also on the driver's operation records.

An objective of the present invention is to provide an electric brake device capable of adjusting a clearance without making a driver feel discomfort, in a vehicle equipped with an electric brake device.

Hereinafter, for convenience of easy understanding, a description will be given with reference to the reference numerals in embodiments.

An electric brake device according to the present invention is an electric brake device DB including: a rotational member 8; a friction member 9 to be brought into contact with the rotational member 8; a friction member operating mechanism 6 configured to generate a braking force by bringing the friction member 9 into contact with the rotational member 8; an electric motor 4 configured to drive the friction member operating mechanism 6; and a control device 2 configured to control the electric motor 4 so as to adjust a clearance between the rotational member 8 and the friction member 9. The control device 2 includes: a brake operation amount detector 24 configured to detect an operation amount to a brake operation member 27 of a vehicle equipped with the electric brake device DB; an operation record flag storage unit 19 configured to store an operation record flag indicating a record of a latest operation performed by a driver to the brake operation member 27, on the basis of the operation amount detected by the brake operation amount detector 24; and a target clearance determination unit 17 configured to determine a target clearance indicating a target value of the clearance, with reference to the operation record flag stored in the operation record flag storage unit 19.

The operation state of the brake operation member 27 operated by the driver changes moment by moment, or is maintained in a constant state. The "record of the latest operation" is a record of a most recent operation to the brake operation member 27.

According to this configuration, the brake operation amount detector 24 detects the operation amount to the brake operation member 27 in the vehicle. The operation record flag storage unit 19 stores an operation record flag indicating the record of the latest operation performed by the driver to the brake operation member 27, on the basis of the operation amount detected by the brake operation amount detector 24. The operation record flag is stored in the operation record flag storage unit 19 in a rewritable manner. The target clearance determination unit 17 determines the target clearance with reference to the operation record flag.

In order to inhibit unnecessary change of the clearance and reduce occurrence frequency of noise, it is appropriate to perform control such that the clearance is kept eliminated when the vehicle is stopped with the brake operation member 27 being operated, and the clearance is kept as it is without being eliminated when the vehicle is stopped with the brake operation member 27 being not operated. In order to realize this control, the operation record flag as a flag for holding the record of the operation to the brake operation member 27 may be used. When determining the target clearance, the target clearance determination unit 17, by referring to the operation record flag, can prevent the clearance from being unexpectedly changed while the driver is not operating the brake operation member 27. Thus, the driver is prevented from feeling discomfort.

The control device 2 may include a pressing command unit 18 configured to determine a command value of a pressing force that causes the braking force. The pressing command unit 18 includes: a pressing force generation section 29 configured to generate the command value of the pressing force in accordance with the operation amount detected by the brake operation amount detector 24, during the brake operation member 27 being operated; and a clearance adjustment section 30 configured to adjust an actual clearance so as to coincide with the target clearance, with reference to the operation record flag stored in the operation record flag storage unit 19, during no operation being applied to the brake operation member 27.

According to this configuration, while the driver is operating the brake operation member 27, the pressing force generation section 29 generates the command value of the pressing force, in accordance with the operation amount detected by the brake operation amount detector 24. When the friction member operating mechanism 6 drives the electric motor 4 in accordance with the generated command value, the friction member operating mechanism 6 brings the friction member 9 into contact with the rotational member 8 to generate a braking force. Thus, the braking force can be applied to the vehicle.

While the driver is not operating the brake operation member 27, the clearance adjustment section 30 adjusts the actual clearance so as to coincide with the target clearance with reference to the operation record flag. In this case, the clearance is not reduced zero from a value other than zero (e.g., stand-by position of the friction member 9) unless the brake operation member 27 has been operated just previously or immediately before the stop. Since useless adjustment of the clearance is avoided, unnecessary dragging torque can be reduced, thereby preventing decreasing electric mileage. Further, since the pressing command unit 18 and the target clearance determination unit 17 perform processing independently from each other, branching of conditional determination and determination of priority can be simplified.

The control device 2 includes: a vehicle stop detector 23 configured to detect whether or not the vehicle is at a stop; and an accelerator operation detector 21 configured to detect whether or not an accelerator operation member 28 in the vehicle is being operated. The target clearance determination unit 17 may determine the target clearance on the basis of: whether or not the vehicle is at a stop, which is detected by the vehicle stop detector 23; whether or not the accelerator operation member 28 is being operated, which is detected by the accelerator operation detector 21; and the operation record flag stored in the operation record flag storage unit 19 to be read.

According to this configuration, the vehicle stop detector 23 detects whether or not the vehicle is at a stop. The accelerator operation detector 21 detects whether or not the accelerator operation member 28 is being operated. The results are inputted to the target clearance determination unit 17. Further, the target clearance determination unit 17 receives the operation record flag, and determines the target clearance. Since the target clearance is determined based on not only the operation record flag but also the result as to whether or not the vehicle is at a stop and the result as to whether or not the accelerator operation member 28 is being operated, unnecessary change of the clearance can be inhibited, and occurrence frequency of noise can be reliably reduced.

During no operation being applied to the brake operation member 27, when the accelerator operation detector 21 detects that the accelerator operation member 28 is not being operated, the vehicle stop detector 23 detects that the vehicle is at a stop, and the operation record flag is "ON" indicating a contact state where the friction member 9 is in contact with the rotational member 8, the target clearance determination unit 17 sets the target clearance to zero to maintain the contact state between the rotational member 8 and the friction member 9. If the operation record flag is "ON" as described above, it means that the vehicle has been stopped with the brake operation member 27 being operated at least once, or the brake operation member 27 has been operated after the vehicle was stopped. In order to avoid unnecessary adjustment of the clearance in this state, the target clearance is set to zero to maintain the contact state between the rotational member 8 and the friction member 9.

During no operation being applied to the brake operation member 27, when the accelerator operation detector 21 detects that the accelerator operation member 28 is being operated, the target clearance determination unit 17 may set the operation record flag to "OFF" indicating a non-contact state where the friction member 9 is not in contact with the rotational member 8, to set the target clearance to a predetermined size other than zero.

According to this configuration, when the result of the determination is that the accelerator operation member 28 is being operated, the operation record flag is set to "OFF". The reason is as follows. Since the operation record flag is a flag for holding the record of the operation to the brake operation member 27 immediately before stopping of the vehicle, if an operation to the accelerator operation member 28 which represents that the driver attempts to re-accelerate is detected, the record of the operation to the brake operation member 27 is reset. The operation record flag is then set to "OFF", and the target clearance is set to a clearance (other than zero) that allows the friction member 9 to be located at a stand-by position because the driver attempts to re-accelerate.

During no operation being applied to the brake operation member 27, when the vehicle stop detector 23 detects that the vehicle is traveling, the target clearance determination unit 17 may set the operation record flag to "OFF" indicating a non-contact state where the friction member 9 is not in contact with the rotational member 8, to set the target clearance to a predetermined size other than zero.

According to this configuration, when the vehicle stop detector 23 detects that the vehicle is traveling, the operation record flag is set to "OFF". The reason is as follows. Since the operation record flag is a flag for holding the record of the operation to the brake operation member 27 immediately before stopping of the vehicle, if a state during traveling which allows the traveling state (so-called inertial traveling) of the vehicle even without an operation to the accelerator operation member 28 and represents that the driver intends to maintain the traveling state, is confirmed, the record of the operation to the brake operation member 27 is reset. The operation record flag is then set to "OFF", and the target clearance is set to a clearance (other than zero) that allows the friction member 9 to be located at the stand-by position because the driver intends to maintain the traveling state.

During no operation being applied to the brake operation member 27, when the accelerator operation detector 21 detects that the accelerator operation member 28 is not being operated, the target clearance determination unit 17 may set the target clearance to a predetermined size other than zero when the operation record flag is "OFF" indicating a non-contact state where the friction member 9 is not in contact with the rotational member 8. In this case, the vehicle is stopped from inertial traveling without an operation to the brake operation member 27, or is traveling. The target clearance is then set to a clearance (other than zero) that allows the friction member 9 to be located at the stand-by position, whereby unnecessary adjustment of the clearance can be avoided.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 2 is a block diagram showing a control system of the electric brake device shown in FIG. 1;

FIG. 8 is a diagram showing examples of transitions of an accelerator pedal operation amount and a vehicle speed, other than those shown in FIG. 7;

FIG. 9 is a flowchart showing an operation, for determination regarding clearance open, of the electric brake device according to the first variant;

FIG. 10 is a flowchart showing an operation, for determination regarding clearance close, of the electric brake device according to the first variant;

FIG. 11 is a diagram showing examples of transitions of an accelerator pedal operation amount and a vehicle speed, in a vehicle equipped with an electric brake device according to the second variant;

DESCRIPTION OF EMBODIMENTS

Figure 1:
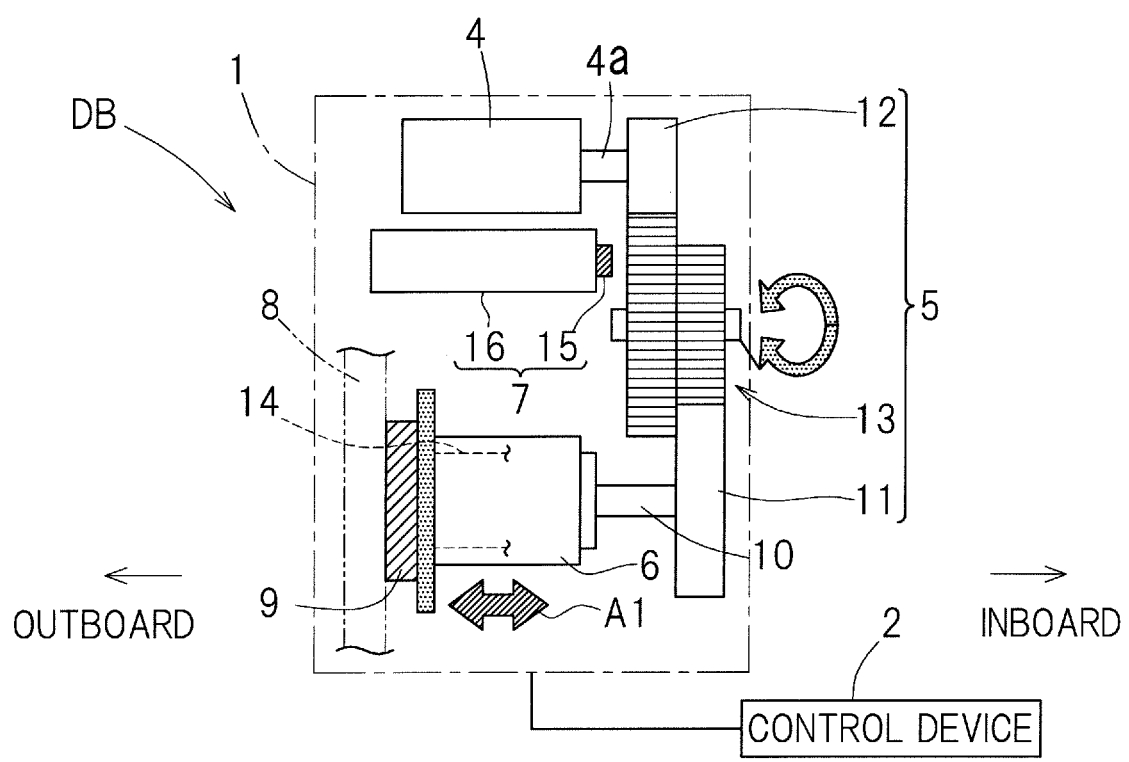
FIG. 1 is a diagram showing a schematic structure of an electric brake device according to a first embodiment of the present invention.

An electric brake device according to a first embodiment of the present invention will be described with reference to FIGS. 1 to 4. As shown in FIG. 1, an electric brake device DB includes an electric brake actuator 1, and a control device 2. First, the electric brake actuator 1 will be described.

The electric brake actuator 1 includes: an electric motor 4; a speed reduction mechanism 5 for reducing a speed of rotation of the electric motor 4; a linear motion mechanism 6 as a friction member operating mechanism; a parking brake mechanism 7 as a parking brake; a brake rotor 8 as a rotational member; and a friction member 9. The electric motor 4, the speed reduction mechanism 5, and the linear motion mechanism 6 are incorporated in, for example, a housing or the like (not shown). The brake rotor 8 may be a disk type or a drum type. The friction member 9 is a brake pad, a brake shoe, or the like. The linear motion mechanism 6 is a feed screw mechanism such as a ball screw mechanism or a planetary roller screw mechanism.

The electric motor 4 is preferably a brushless DC motor having high torque density, which includes, for example, an exciting coil, a motor angle sensor, and a rotor having a permanent magnet (any of these components of the electric motor 4 are not shown). The speed reduction mechanism 5 is a mechanism that reduces the speed of rotation of the electric motor 4 and transmits the rotation to a tertiary gear 11 fixed to a rotation shaft 10. The speed reduction mechanism 5 includes a primary gear 12, an intermediate gear 13, and the tertiary gear 11. In this example, the speed reduction mechanism 5 reduces, by the intermediate gear 13, the speed of rotation of the primary gear 12, mounted to a rotor shaft 4a of the electric motor 4, and allows the rotation to be transmitted to the tertiary gear 11, fixed to an end portion of the rotation shaft 10. These gears 11 to 13 are rotatable either clockwise or counterclockwise.

The linear motion mechanism 6 configured to covert, by the feed screw mechanism, rotary motion outputted from the speed reduction mechanism 5 into linear motion of a linear motion portion 14, and to bring the friction member 9 into contact with the brake rotor 8 or separate the friction member 9 from the brake rotor 8. The linear motion portion 14 is supported so as to be movable in an axial direction A1 in the whirl-shop fashion. The friction member 9 is provided at an outboard end of the linear motion portion 14. When rotation of the electric motor 4 is transmitted to the linear motion mechanism 6 via the speed reduction mechanism 5, the rotary motion is converted into linear motion, which is then converted into a pressing force of the friction member 9, whereby a braking force is generated. The term "outboard" means the outer side of the vehicle, carrying the electric brake device DB, in the vehicle width direction. The center side of the vehicle in the vehicle width direction is referred to as "inboard".

The parking brake mechanism 7 includes a locking member 15 and an actuator 16. In an outboard end surface of the intermediate gear 13, a plurality of locking holes (not shown) are formed at equal intervals in the circumferential direction. The locking member 15 is configured to be engageable with any one of the locking holes. The actuator 16 may be a solenoid. The locking member (solenoid pin) 15 may be advanced by the actuator 16 and fitted into the locking hole, which is formed in the intermediate gear 13, so as to be engaged with locking hole, thereby inhibiting rotation of the intermediate gear 13. Thus, the parking brake mechanism 7 enters a parking lock state. The locking member 15 may be retracted into the actuator 16 to be disengaged from the locking hole, thereby allowing the intermediate gear 13 to rotate. Thus, the parking brake mechanism 7 enters an unlock state.

The control device 2 and the like are described.

The electric motor 4 and the control device 2 are supplied with power from a power supply device (not shown). The control device 2 is configured to control the braking force to be caused by the electric motor 4, and adjust a clearance between the brake rotor 8 and the friction member 9.

As shown in FIG. 2, the control device 2 includes a target clearance determination unit 17, a pressing command unit 18, an operation record flag storage unit 19, and a detector group 20, including a plurality of detectors. The plurality of detectors include an accelerator pedal operation detector 21, a vehicle speed detector 22, a vehicle stop detector 23, and a brake operation amount detector 24. The target clearance determination unit 17 includes an operation record flag off section 25 and a clearance determination section 26. The operation record flag off section 25 is electrically connected to the operation record flag storage unit 19, the clearance determination section 26, the accelerator pedal operation detector (accelerator operation detector) 21, and the vehicle stop detector 23. The control device 2 includes a processor, which is programmed so as to execute algorithms of the respective components of the control device 2.

The operation record flag off section 25 has a function of setting an operation record flag to "OFF". Specifically, when the accelerator pedal operation detector 21 detects that an accelerator operation member, such as an accelerator pedal, 28 is operated or activated during no operation being applied to a brake operation member, such as a brake pedal, 27, the operation record flag off section 25 sets the operation record flag to "OFF". Thus, whether or not the accelerator operation member 28 has been operated can be determined based on an accelerator pedal operation flag. The operation record flag indicates a record of a latest operation of a driver to the brake operation member 27. The operation record flag is stored in the operation record flag storage unit 19 in a rewritable manner. The operation record flag is accessible from both the target clearance determination unit 17 and the pressing command unit 18, is set to "ON" or "OFF", and is referred to.

The operation record flag being "OFF" means that the friction member 9 (FIG. 1) is in a non-contact state in which the friction member 9 is not in contact with the brake rotor 8 (FIG. 1). The status of the operation record flag being "OFF" is stored in the operation record flag storage unit 19, and is transmitted to the clearance determination section 26. Whether or not the brake operation member 27 is in the non-operated state is determined by the brake operation amount detector 24. This determination method is also applied to the determinations in the following description.

When the vehicle stop detector 23 detects that the vehicle is traveling during no operation being applied to the brake operation member 27, the operation record flag off section 25 sets the operation record flag to "OFF". Thus, whether or not the vehicle is traveling can be determined based on a vehicle stop flag. The status of the operation record flag being "OFF" is stored in the operation record flag storage unit 19, and is transmitted to the clearance determination section 26.

When the accelerator pedal operation detector 21 detects that the accelerator operation member 28 is operated and the status of the operation record flag being "OFF" is inputted from the operation record flag off section 25, the clearance determination section 26 sets a target clearance to a predetermined size other than zero. That is, the clearance determination section 26 sets the target clearance to a clearance (other than zero) that allows the friction member 9 to be located at a stand-by position. The stand-by position at which the friction member 9 is located is a position making a clearance which brings about an allowable delay of rising of a braking force when the brake operation member 27 is operated.

The allowable delay is predetermined based on the result of a test, simulation, or the like. Even if a dragging torque occurs with the clearance, the dragging torque desirably does not make the driver feel discomfort during traveling, or does not cause a problem of heat generation between the brake rotor 8 (FIG. 1) and the friction member 9 (FIG. 1). The clearance determination section 26 sets the target clearance to a clearance (other than zero) that allows the friction member 9 to be located at the stand-by position, when the vehicle stop detector 23 detects that the vehicle is traveling and the status of the operation record flag being "OFF" is inputted from the operation record flag off section 25.

When the accelerator pedal operation detector 21 detects that the accelerator operation member 28 is not operated during no operation being applied to the brake operation member 27, if the status of the operation record flag being "OFF" is inputted from the operation record flag off section 25, the clearance determination section 26 sets the target clearance to a clearance (other than zero) that allows the friction member 9 to be located at the stand-by position.

If all the following conditions (1), (2), and (3) are satisfied during no operation being applied to the brake operation member 27, the clearance determination section 26 sets the target clearance to zero, thereby maintaining the contact state between the brake rotor 8 (FIG. 1) and the friction member 9 (FIG. 1). This contact state has a degree of contact in which a dragging torque due to the contact of the brake rotor 8 (FIG. 1) and the friction member 9 (FIG. 1) is allowable. By using the electric brake device DB according to the present embodiment, since the contact state is not maintained while the vehicle is traveling with the brake operation member 27 being not operated, the allowable dragging torque can be increased.

Condition (1): the accelerator pedal operation detector 21 detects no operation on the accelerator operation member 28.

Condition (2): the vehicle stop detector 23 detects that the vehicle is at a stop.

Condition (3): The operation record flag stored in the operation record flag storage unit 19 is "ON", and the status of the operation record flag being "ON" is inputted to the clearance determination section 26 via the operation record flag off section 25.

The pressing command unit 18 has a function of determining a command value of a pressing force that causes a braking force. The pressing command unit 18 includes a pressing force generation section 29, a clearance adjustment section 30, and an operation record flag on section 31. The pressing force generation section 29 generates a command value of a pressing force according to an operation amount detected by the brake operation amount detector 24 during the brake operation member 27 being operated. The pressing force generation section 29 converts the generated command value of the pressing force into a corresponding current command, so that the electric motor 4 (FIG. 1) is driven according to the current command, whereby the friction member 9 (FIG. 1) comes into contact with the brake rotor 8 (FIG. 1), and a braking force is generated.

The clearance adjustment section 30 performs control so as to make the actual clearance coincide with the target clearance determined by the clearance determination section 26. Specifically, the clearance adjustment section 30 converts the determined target clearance into a current command based on a voltage value, and finally a current is caused to flow in the electric motor 4 (FIG. 1). Thus, the actual clearance is adjusted.

The operation record flag on section 31 has a function of setting the operation record flag to "ON", based on the operation amount detected by the brake operation amount detector 24. The status of the operation record flag being "ON" is stored in the operation record flag storage unit 19 in a rewritable manner, and is provided to the clearance determination section 26 via the operation record flag off section 25.

Figure 3A:
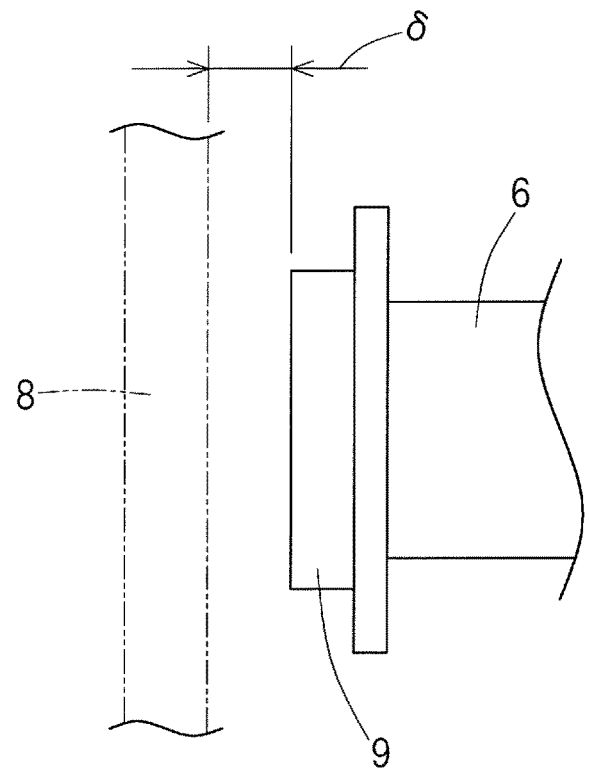
FIG. 3A is a diagram for explaining a clearance between a brake rotor and a friction member in the electric brake device shown in FIG. 1.

When the clearance determination section 26 sets the target clearance to a clearance (other than zero) that allows the friction member 9 to be located at the stand-by position and the actual clearance is adjusted by the clearance adjustment section 30, the linear motion mechanism 6 is driven so as to secure a predetermined clearance $\delta$ between the brake rotor 8 and the friction member 9 as shown in FIG. 3A. The predetermined clearance $\delta$ is based on the result of a test, simulation, or the like.

Figure 3B:
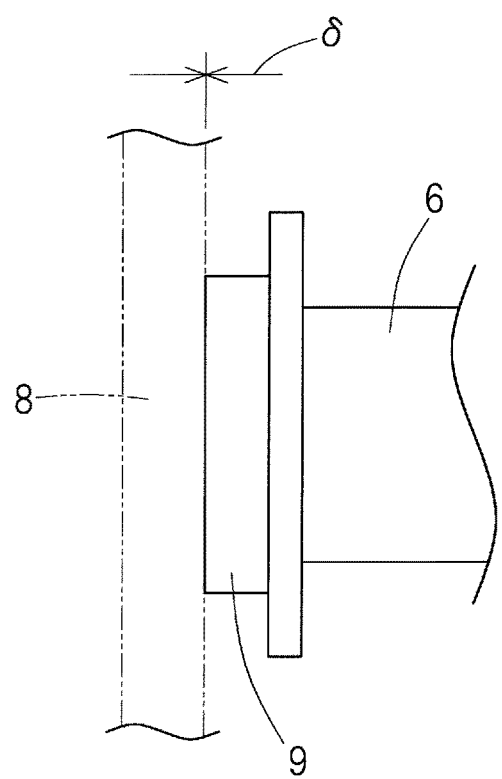
FIG. 3B is a diagram for explaining the clearance between the brake rotor and the friction member in the electric brake device shown in FIG. 1.

When the clearance determination section 26 shown in FIG. 2 sets the target clearance to zero and the actual clearance is adjusted by the clearance adjustment section 30, the linear motion mechanism 6 is driven so as to eliminate the clearance $\delta$ between the brake rotor 8 and the friction member 9 (so as to satisfy $\delta=0$) as shown in FIG. 3B.

Figure 4:
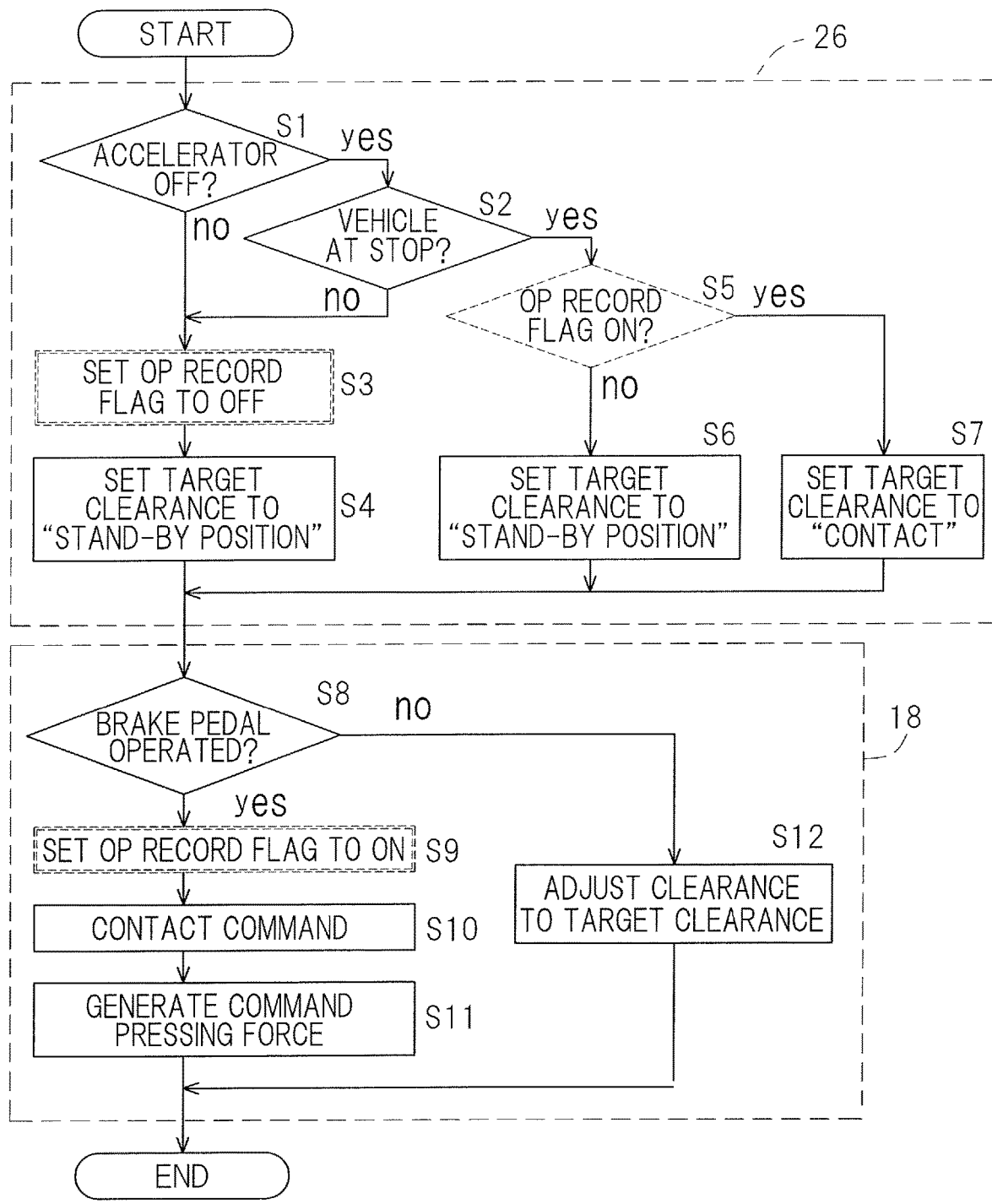
FIG. 4 is a flowchart showing an example of a process for adjusting a clearance by the electric brake device shown in FIG. 1.

FIG. 4 is a flowchart showing an operation for adjusting the clearance by the electric brake device DB (FIG. 1). Hereinafter, FIG. 1 and FIG. 2 are also referred to as appropriate. This flowchart is illustrated as a flow having completion of processing, i.e., from "start" to "end", for convenience of illustration. However, in an actual program, this flow is constantly executed after power-on. For example, this flow is executed once per cycle of calculation of a CPU of the control device 2 that executes this flow.

First, the target clearance determination unit 17 performs processing. After the process is started, the accelerator pedal operation detector 21 checks whether no operation is being applied to the accelerator operation member 28, i.e., in an accelerator-off state (step S1), and the vehicle stop detector 23 checks whether the vehicle is at a stop (step S2). In step S1, the determination as to whether or not an operation is being applied to the accelerator operation member 28 is performed based on the accelerator pedal operation flag obtained from the accelerator pedal operation detector 21.

In step S2, the determination as to whether the vehicle is traveling or at a stop is performed based on the vehicle stop flag outputted by the vehicle stop detector 23, on the basis of vehicle speed information obtained from the vehicle speed detectors 22. The reason why the vehicle stop detector 23 is separated from the vehicle speed detectors 22 is as follows. That is, in order to exactly perform determination as to whether the vehicle is at a stop, it is desirable to perform the determination based on the vehicle speeds at respective four wheels of the vehicle being integrated, and it is highly difficult to set a dead zone for preventing hunting that causes, when the vehicle speed is low, high-speed switching between determination that the vehicle is at a stop and determination that the vehicle is traveling, which leads to vibrational operation.

When the accelerator operation member 28 is in an accelerator-on state (no in step S1) or the vehicle is traveling (no in step S2), the operation record flag is set to "OFF" (step S3). The reason is as follows. Since the operation record flag is a flag for holding the record of the operation to the brake operation member 27 immediately before stopping of the vehicle, if an operation to the accelerator operation member 28 which represents that the driver attempts to re-accelerate, or a state during traveling which allows the traveling state (inertial traveling) even without an operation to the accelerator operation member 28, and represents that the driver intends to maintain the traveling state, is confirmed, the record of the operation to the brake operation member 27 is reset. The operation record flag is then set to "OFF" (step S3). Since the driver intends to maintain the traveling state, the target clearance is set to a value that allows the friction member 9 to be located at the stand-by position (step S4).

When the accelerator operation member 28 is in the accelerator-off state (yes in step S1) and the vehicle is at a stop (yes in step S2), the operation record flag in the previous performance cycle is checked (step S5). If the operation record flag is "OFF" (no in step S5), it means that the vehicle is stopped from the inertial traveling without a brake operation, and the target clearance is set to a value that allows the friction member 9 to be located at the stand-by position (step S6).

In step S5, if the operation record flag is "ON" (yes in step S5), it means that the vehicle is stopped with an operation performed to the brake operation member 27 or the brake operation member 27 is operated after the vehicle is stopped. In this case, in order to avoid unnecessary adjustment of the clearance, the target clearance is set to zero that allows the friction member 9 to come into contact with the rotational member 8 (step S7). After the target clearance has been determined, the process proceeds to step S8.

Next, the pressing command unit 18 performs processing. The pressing command unit 18 checks whether or not an operation is being applied to the brake operation member (brake pedal) 27 (step S8). In step S8, this is determined based on a brake operation amount obtained from the brake operation amount detector 24. The reason why not a flag but an operation amount is used for the brake operation member 27 is as follows. As for the accelerator operation member 28, only whether or not an operation is being applied to the accelerator operation member 28 is needed for processing, and this can be managed by the flag. As for the brake operation member 27, the operation amount thereof is also needed for control. However, the brake operation amount can be treated like a flag in such a manner that, when the brake operation amount is compared with a threshold, if it is not less than the threshold, it can be determined that brake operation is performed. The threshold is predetermined based on the result of a test, simulation, or the like.

If an operation is being applied to the brake operation member 27 (yes in step S8), the operation record flag is set to "ON" (step S9), and the clearance is set to "contact state" to bring the friction member 9 into contact with the brake rotor 8 (step S10). At the same time, a pressing force is generated according to the operation amount of the brake operation member 27 (step S11). If no operation is being applied to the brake operation member 27 (no in step S8), control is performed so as to make the actual clearance coincide with the target clearance determined by the target clearance determination unit 17 (step S12). Thereafter, this process is ended.

Advantageous effects of the present embodiment will be described. As for the situation where the vehicle is stopped while the accelerator operation member 28 and the brake operation member 27 are in the non-operated states, the following situations are conceivable.

In a vehicle in which creep torque is generated, there is a time when the vehicle speed becomes zero on a gentle ascent where the creep torque and a force caused by the vehicle weight are well balanced. In a case where a vehicle, which is in the inertial traveling state, enters a steep ascent where the vehicle may move backward with the creep torque alone, when the vehicle decelerates and moves backward, there is a time when the vehicle speed momentarily becomes zero. Further, in a case where the driver adjusts forward and backward movements thereof by stepping on and releasing the accelerator operation member 28 to prevent the vehicle from moving backward, it is highly possible that the vehicle speed becomes zero while the accelerator operation member 28 and the brake operation member 27 are in the non-operated states.

On the other hand, as for the situation where no creep torque is generated, the following situations are conceivable: the shift position of the vehicle being in the neutral range; the clutch being released; and the vehicle generating no creep torque even in the drive position. In these cases, it is highly possible that the vehicle speed becomes zero or so low that the vehicle may be determined to be at a stop when the accelerator operation member 28 and the brake operation member 27 are in the non-operated states, in many situations such as when the vehicle waits for the traffic light to change, and when the vehicle turns right or left, while the vehicle travels in the towns.

In the cases described above, if the conventional technique was used, it would be highly possible that unnecessary clearance change occurs, because the contact state with the clearance being zero occurs at the moment when the vehicle speed becomes zero, and thereafter, the friction member 9 is moved to the stand-by position with the clearance being other than zero when the accelerator is operated or the vehicle starts to move. Under such circumstances, the clearance should not be changed because no operation is being applied to the brake operation member 27. In particular, if determination, on the software program, that the vehicle is stopped does not coincide with the time when the driver feels that the vehicle is stopped, the driver feels significant discomfort due to noise.

In a case where it is determined that the vehicle is at a stop under a situation where the vehicle is not completely stopped (the vehicle slightly moves but the movement is not greater than the threshold for determination of stopping), a braking force caused by elimination of the clearance causes the driver to feel deceleration (pitching motion), which also makes the driver feel discomfort.

The situations as described above occur when the vehicle speed is low and delicate operation is needed, for example, during garaging. If the situations occur frequently, the driver would feel significant discomfort with the conventional technique.

Even under the situations described above, the electric brake device DB according to the present embodiment removes unnecessary clearance change, thereby preventing the driver from feeling discomfort. The clearance is not reduced to zero from the stand-by position or the like unless the brake operation member 27 is operated. Since useless adjustment of the clearance is avoided, unnecessary dragging torque is reduced, thereby preventing decreasing electric mileage.

Since the pressing command unit 18 and the target clearance determination unit 17 perform processing independently from each other, branching of conditional determination and determination of priority can be simplified. When the brake operation member 27 is operated, the clearance is immediately eliminated, and a pressing force is generated according to the operation amount of the brake operation member 27. During all this time, the clearance is zero, and is hardly affected by other vehicle conditions. Control to be performed when the brake operation member 27 is operated is independent, which is performed by the pressing command unit 18, thereby simplifying the processing.

Also in the process of determining the target clearance, an input from the brake operation member 27 is not required to be added to the conditional determination, thereby simplifying the determination. In addition, for example, the performance cycle may be longer than that of generation of the pressing command. Therefore, it is effective to independently provide the target clearance determination unit 17. The reason why the performance cycle may be long is as follows. That is, the processing may be performed only when the conditions are satisfied, and the processing may be performed at a speed at which a human does not experience any delay. Therefore, the performance cycle may be longer than that of the pressing command unit that is required to perform the processing at any time.

Hitherto, as for the target clearance, one stand-by position has been described as a position other than "contact". However, as positions other than "contact", some gradual stand-by positions are conceivable, such as a clearance that causes dragging in spite of the clearance, and a clearance that is too large to cause dragging.

The smaller the clearance is, the lower the noise caused by movement from the position with the clearance to the contact position is, and thus the initial response at braking tends to be improved. To the contrary, the greater the clearance is, the higher the noise caused by the movement to the contact position, and thus the initial response at breaking tends to delay. The clearance at the stand-by position may be adjusted in accordance with the vehicle condition and the operation condition, from outside the control device of the present embodiment or by means added to the control device.

Although the present invention has been fully described on the basis of the embodiments thereof, the embodiments disclosed herein are, in all aspects, illustrative and not restrictive. It is intended that the scope of the present invention is defined by claims, not by the above description, and includes all modifications equivalent in meaning and scope to the claims.

Figure 5:
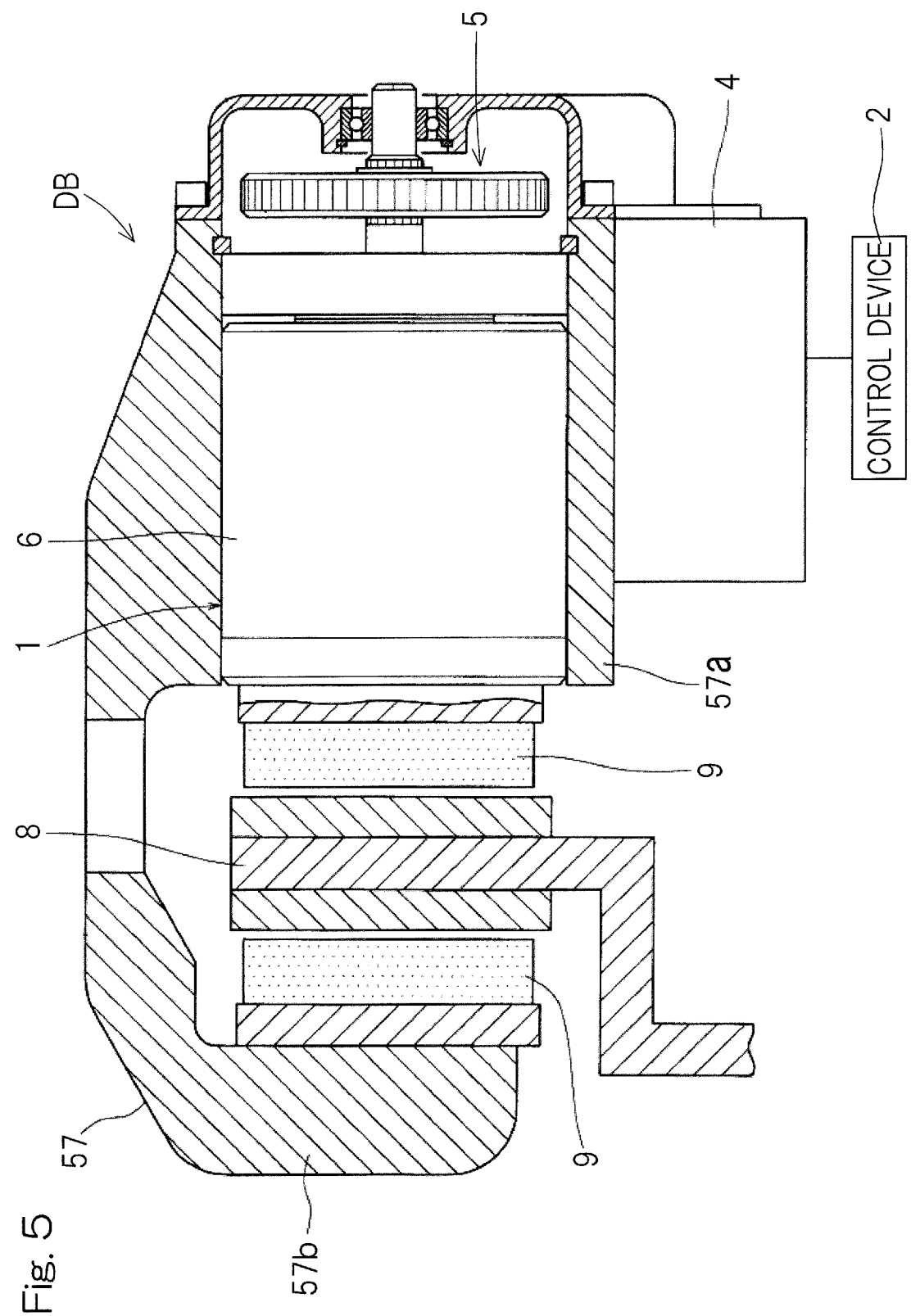
FIG. 5 is a side view showing an electric brake actuator in an electric brake device according to a first variant and a second variant of the present invention.

Next, an electric brake device according to a first variant of the present invention will be described with reference to FIG. 5 to FIG. 10. As shown in FIG. 5, this electric brake device DB includes an electric brake actuator 1 and a control device 2. First, the electric brake actuator 1 will be described.

The electric brake actuator 1 includes: a brake rotor 8 as a rotational member; and paired friction members 9, 9 arranged with the brake rotor 8 therebetween. Each friction member 9 is a friction pad. The brake rotor 8 is a brake disc in this example, and rotates integrally with a wheel (not shown). The brake rotor 8 may be a brake drum.

The electric brake actuator 1 includes: a friction member operating mechanism 6 that brings the friction member 9 into contact with the brake rotor 8 to generate a braking force; and an electric motor 4 that drives the friction member operating mechanism 6. The electric motor 4 may be an AC motor such as a three-phase synchronous motor or induction motor, a DC motor, or the like.

The friction member operating mechanism 6 is composed of: a linear motion mechanism that converts a rotational input from the electric motor 4 via a speed reduction mechanism 5, into a forward/backward linear motion of one of the friction members 9; and the like. The friction member operating mechanism 5 is provided to one opposing portion 57a of paired opposing portions 57a, 57b sandwiching the brake rotor 8 in a caliper body 57. One of the friction members 9 is attached to an end of the friction member operating mechanism 6, and the other friction member 9 is attached to the other opposing portion 57b of the caliper body 57. The caliper body 57 is provided movably in the axial direction of the brake rotor 8 with respect to a mount (not shown) fixed to a knuckle (not shown) supporting the wheel.

The control device 2 and the like will be described. The electric motor 4 and the control device 2 are supplied with power from a power supply device (not shown). The control device 2 is configure to control the braking force generated by the electric motor 4, and adjust a clearance between the brake rotor 8 and the friction member 9. The control device 2 includes a processor, which is programmed so as to execute algorithms of later-described components of the control device 2.

Figure 6:
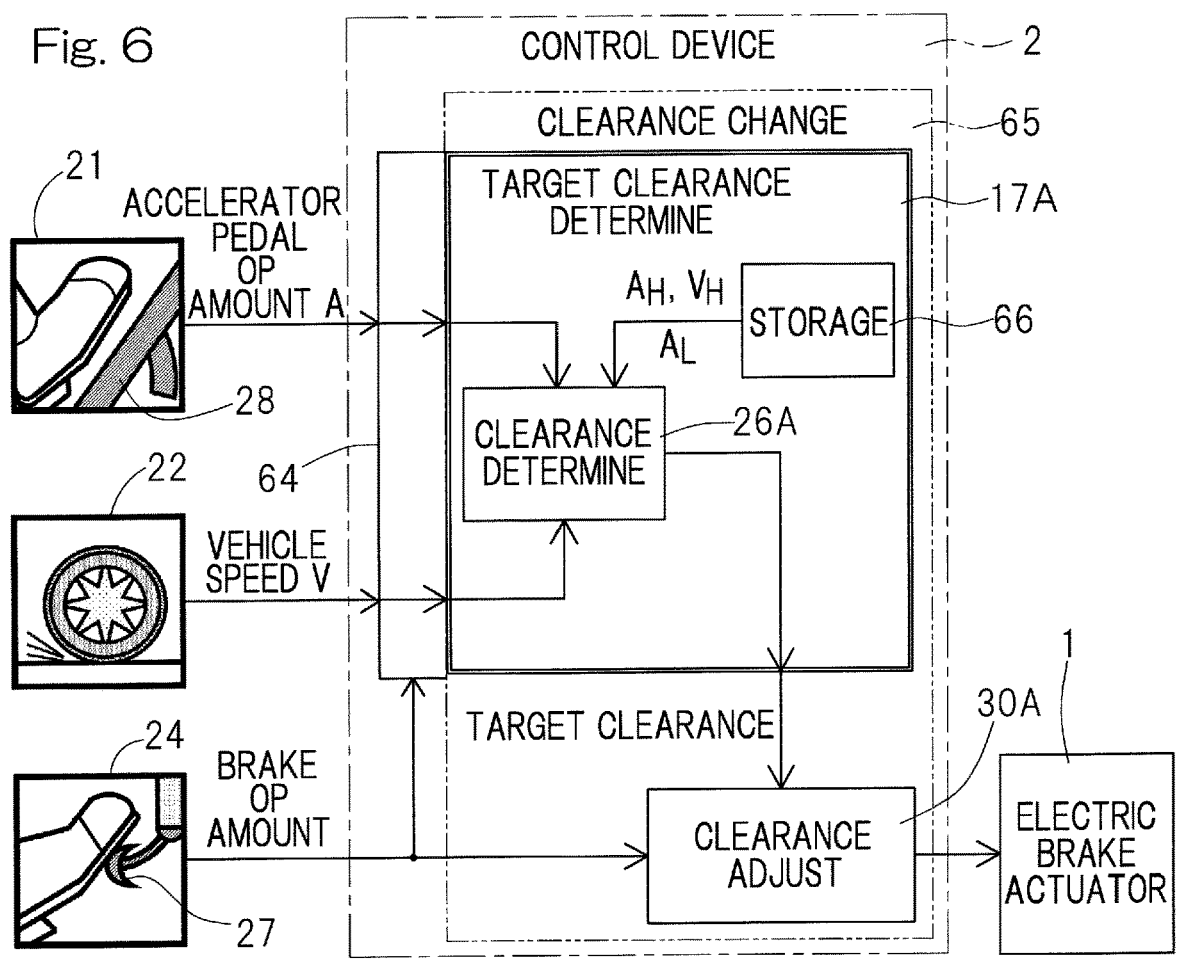
FIG. 6 is a block diagram showing a control system of the electric brake device shown in FIG. 5.

As shown in FIG. 6, a vehicle equipped with the electric brake device includes: a vehicle speed detector 22, each detects the speed of the vehicle, i.e., a vehicle speed V; an accelerator pedal operation detector 21; and a brake operation amount detector 24. The vehicle speed detector 22 may be a vehicle speed sensor. The accelerator pedal operation detector 21 serving as an accelerator operation amount detector detects an accelerator pedal operation amount (accelerator operation amount) of an accelerator pedal 28, which is an accelerator operation member. The brake operation amount detector 24 detects a brake operation amount of a brake pedal 27, which is a brake operation member.

The control device 2 includes a monitoring module 64 and a clearance change module 65. The monitoring module 64 constantly monitors the vehicle speed detected by the vehicle speed detector 22 and the accelerator pedal operation amount detected by the accelerator pedal operation detector 21, in a brake non-operated state where no brake operation amount is detected by the brake operation amount detector 24. When a brake operation amount is detected by the brake operation amount detector 24, the monitoring module 64 refrains from monitoring the vehicle speed and the accelerator pedal operation amount, and a later-described clearance determination section refrains determining a target clearance.

The clearance change module 65 includes a target clearance determination unit 17A and a clearance adjustment unit 30A. The target clearance determination unit 17A includes a clearance determination section 26A, and a storage unit 66 that stores therein later-described criteria such as thresholds. The clearance determination section 26A determines a target clearance, that is, a target value of clearance.

The clearance determination section 26A according to this variant changes the target clearance from a close proximity state to an extended state, when both the following conditions (4) and (5) are satisfied. The close proximity state is a state in which the target clearance is reduced in preparation for braking. In this state, the target clearance is narrow but dragging torque is as small as an allowable level. The extended state is a state obtained by extending the target clearance from the close proximity state.

Condition (4): an accelerator pedal operation amount A monitored by the monitoring module 64 exceeds a first accelerator operation threshold $A_H$.

Condition (5): a vehicle speed V monitored by the monitoring module 64 exceeds a first vehicle speed threshold $V_H$.

The first accelerator operation threshold $A_H$ and the first vehicle speed threshold $V_H$ are stored in the storage unit 66, and are read by the clearance determination section 26A any time to be used for determination in the clearance determination section 26A. Specific numerical values of the first accelerator operation threshold $A_H$ and the first vehicle speed threshold $V_H$ are set as follows.

The first accelerator operation threshold $A_H$ is determined by performing the reverse operation from a torque that is required for obtaining an acceleration (e.g., 0.2 G) required for reacceleration after signal stop, for example. The first vehicle speed threshold $V_H$ is set to a speed, such as 15 km/h, higher than a traveling speed in a situation such as garaging or movement in a parking area so as to prevent the clearance from being frequently changed.

When both the above conditions (4) and (5) are satisfied, the clearance determination section 26A determines that the driver of this vehicle has clear intention of accelerating, sets the target clearance to the extended state, and provides the target clearance to the clearance adjustment unit 30A.

The clearance adjustment unit 30A performs control so as to make the actual clearance coincide with the target clearance determined by the clearance determination section 26A. Specifically, the clearance adjustment unit 30A converts the determined target clearance into a current command based on a voltage value, and finally causes a current to flow in the electric motor 4 (FIG. 5). Thereby, the actual clearance is adjusted to an "open" state, that is, the extended state. Thus, mileage of the vehicle can be improved.

After the clearance is set in the "open" state, it is checked whether a condition that causes the target clearance to be the close proximity state, i.e., that causes the actual clearance to be a "closed" state, is satisfied. Specifically, the clearance determination section 26A changes the target clearance to the close proximity state when the accelerator pedal operation amount A monitored by the monitoring module 64 becomes less than the second accelerator operation threshold $A_L$. The second accelerator operation threshold $A_L$ is stored in the storage unit 66, and is read by the clearance determination section 26A any time to be used for determination in the clearance determination section 26A.

A specific numerical value of the second accelerator operation threshold $A_L$ is obtained by performing the reverse operation from a torque that is required for maintaining 20 km/h to 30 km/h that is a cruising speed in the towns. If the accelerator pedal operation amount is smaller than the torque required for cruising, it can be determined that the driver does not intend to cruise and is ready for deceleration. The second accelerator operation threshold $A_L$ is set accordingly.

The second accelerator operation threshold $A_L$ is sufficiently smaller than the first accelerator operation threshold $A_H$ that is used for adjustment of the clearance to the "open" state. A difference between the first accelerator operation threshold $A_H$ and the second accelerator operation threshold $A_L$ is a relatively large difference that can prevent hunting in which the target clearance is switched between the close proximity state and the extended state many times in a short time, by neglecting minute increase/decrease in the accelerator operation amount for minutely adjusting the vehicle speed, while securing the accelerator operation amount to prevent excessive reduction in the vehicle speed, which is often performed when the vehicle is cruising. This difference is predetermined based on the result of a test, simulation, or the like. Since the difference between the first accelerator operation threshold $A_H$ and the second accelerator operation threshold $A_L$ is relatively large as described above, clearance adjustment is not performed when the accelerator pedal is operated during cruising of the vehicle, whereas the clearance is reduced only when the accelerator pedal operation amount is reduced to an extent that expresses the driver's intention of inertial traveling or braking.

Figure 7:
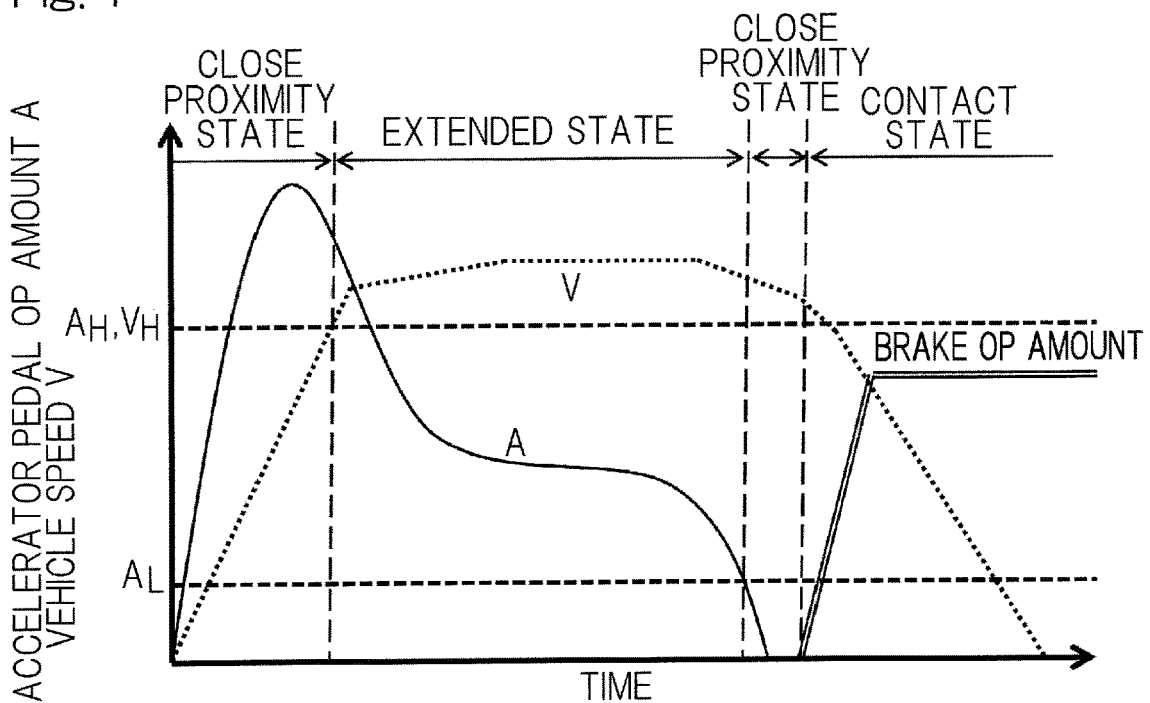
FIG. 7 is a diagram showing examples of transitions of an accelerator pedal operation amount and a vehicle speed, in a vehicle equipped with the electric brake device according to the first variant.

FIG. 7 is a diagram showing examples of transitions of the accelerator pedal operation amount and the vehicle speed in the vehicle equipped with the electric brake device. Hereinafter, FIG. 5 and FIG. 6 are also referred to as appropriate. It is assumed that the vehicle has started acceleration from the stop state. During this time, the electric brake device maintains the close proximity state in which the clearance is reduced in preparation for braking. When a certain time has passed from the stop state, the accelerator pedal operation amount A exceeds the first accelerator operation threshold $A_H$, but the vehicle speed V remains less than or equal to the first vehicle speed threshold $V_H$, and therefore, the close proximity state is maintained.

When the clearance determination section 26A determines that the accelerator pedal operation amount A exceeds the first accelerator operation threshold $A_H$ and the vehicle speed V exceeds the first vehicle speed threshold $V_H$, the target clearance is set to the extended state. Thereafter, when the accelerator pedal operation amount A becomes less than the second accelerator operation threshold $A_L$, the target clearance is reduced to the close proximity state. It is possible to prepare for braking by reducing the target clearance to the close proximity state. Thus, the response performance can be improved.

After the close proximity state, when the brake pedal 27 is operated, a braking force corresponding to the amount of the brake operation is generated.

In an example shown in FIG. 8, since the condition that the accelerator pedal operation amount A exceeds the first accelerator operation threshold $A_H$ and the condition that the vehicle speed V exceeds the first vehicle speed threshold $V_H$ are not satisfied at the same time, the clearance determination section 26A does not determine that both the conditions (4) and (5) are satisfied, and the close proximity state remains unchanged from the stop state of the vehicle.

FIG. 9 is a flowchart showing an operation for determining "clearance open" when the clearance is in the close proximity state, in the electric brake device. The process shown in FIG. 9 is executed by the target clearance determination unit 17A. The flowchart of FIG. 9 is illustrated as a flow having completion of processing, i.e., from "start" to "end", for convenience of illustration. However, in an actual program, this flow is constantly executed after power-on. For example, this flow is executed once per cycle of calculation of the CPU of the control device 2 that executes this flow (the same applies to FIG. 10 described later).

It is assumed that the vehicle has started acceleration from the stop state. After the process is started, the clearance determination section 26A determines whether the accelerator pedal operation amount A exceeds the first accelerator operation threshold $A_H$ (step a1) and the vehicle speed V exceeds the first vehicle speed threshold $V_H$ (step a2). If one of these conditions is not satisfied, the clearance determination section 26A maintains the target clearance as the close proximity state (step a3). Thereafter, the process proceeds to step a5.

When both the above conditions (yes in step a1 and yes in step a2) are satisfied, the clearance determination section 26A changes the target clearance to the extended state (step a4). Thereafter, the process proceeds to step a5. In step a5, the clearance determination section 26A transmits the determined target clearance to the clearance adjustment unit 30A. Then, this process is ended.

FIG. 10 is a flowchart showing an operation for determining "clearance close" when the clearance is in the extended state, in the electric brake device. After the process is started, the clearance determination section 26A determines whether the accelerator pedal operation amount A is less than the second accelerator operation threshold $A_L$ (step b1). When it is determined that the accelerator pedal operation amount A is not less than the second accelerator operation threshold $A_L$ (no in step b1), the clearance determination section 26A maintains the target clearance as the extended state (step b2). Thereafter, the process proceeds to step b4.

When it is determined in step b1 that the accelerator pedal operation amount A is less than second accelerator operation threshold $A_L$ (yes in step b1), the clearance determination section 26A changes the target clearance to the close proximity state (step b3). Thereafter, the process proceeds to step b4. In step b4, the clearance determination section 26A transmits the determined target clearance to the clearance adjustment unit 30A. Thereafter, this process is ended.

In this variant, setting of the thresholds is performed taking into consideration the case of traveling in the towns. However, if a negative factor in the clearance "close" state (overheating due to friction, deterioration of fuel efficiency, or the like) is an allowable level for traveling in the towns but becomes a problem during high-speed cruising, the respective thresholds may be increased so that the control according to this variant is executed only during high-speed cruising.

As a result, the set target clearance is transmitted to the clearance adjustment unit 30A. The target clearance determined hitherto is a clearance while no operation is being applied to the brake pedal 27. When the brake pedal 27 is operated, the brake operation amount from the brake operation amount detector 24 is inputted to the clearance adjustment unit 30A, and the clearance adjustment unit 30A executes control so as to make the contact state or the like in accordance with the brake operation amount. During no operation being applied to the brake pedal 27, the clearance adjustment unit 30A executes a control so as to make the actual clearance coincide with the target clearance.

In the flowchart of FIG. 9 showing the operation for determining "clearance open" when the clearance is in the close proximity state, if the condition for "clearance open" is not satisfied, the target clearance is maintained in the close proximity state (step a3). Meanwhile, in the flowchart of FIG. 10 showing the operation for determining "clearance close" when the clearance is in the extended state, if the condition for "clearance close" is not satisfied, the target clearance is maintained in the extended state (step b2). However, in present variant, it is specifically indicated that the framework of the control is not changed, and it does not mean that a change by control outside the scope of the present variant is not allowed.

Advantageous effects of the present variant will be described below. In the brake non-operated state, the monitoring module 64 monitors the vehicle speed detected by the vehicle speed detector 22 and the accelerator operation amount detected by the accelerator pedal operation detector 21. The clearance determination section 26A determines the target clearance to be set to the extended state when both the vehicle speed and the accelerator operation amount monitored satisfy the set conditions. When the driver has clear intention of accelerating and during cruising after the acceleration, the driver should operate the accelerator pedal 28 relatively strongly to increase the vehicle speed, and thereafter, should make an input of an accelerator operation amount not less than a certain level while increasing and decreasing the vehicle speed to some extent.

In the brake non-operated state, if the sign as described above is seen from the vehicle speed or the accelerator operation amount being monitored, the clearance is changed in accordance with the determined target clearance. In the case where the vehicle speed increases, even when the clearance is changed, the driver is less likely to mind noise caused by the clearance change because there is road noise, that is, the level of noise around the vehicle increases. Also in the case where there is an input of the accelerator pedal operation amount not less than the certain level, the driver is less likely to mind the noise caused by the clearance change, because of noises of the engine and the motor caused by the acceleration of the vehicle. Therefore, during no operation being applied to the brake pedal 27, the clearance can be adjusted without making the driver feel discomfort.

A second variant will be described. In the following description, portions corresponding to the matters described in the preceding variant are designated by the same reference numerals in the present variant, and the redundant description thereof is omitted. When only a part of a configuration is described, the remaining part of the configuration is the same as that of the previously described variant unless otherwise specified. The same advantageous effects are achieved by the same configuration. In addition to the combinations of portions described specifically in each embodiment and each variant, it is also possible to partially combine the embodiments and the variants unless any problem is particularly posed due to the combination.

In the above description, the control flow is set to be optimum on a flat road or a gentle slope. However, when situations on a steep ascent and a steep descent are considered, there are cases where the clearance should be changed even when both the above conditions (conditions (4) and (5)) are not satisfied.

For example, as shown in FIG. 11, on a steep ascent where the monitored accelerator pedal operation amount A significantly exceeds the first accelerator operation threshold $A_H$ and is maintained in this state while the monitored vehicle speed V remains less than or equal to the first vehicle speed threshold $V_H$, the target clearance should be set to the extended state in order to reduce the dragging torque as much as possible. Therefore, a value $A_{VH}$ greater than the first accelerator operation threshold $A_H$ is used as a third accelerator operation threshold, and when the accelerator pedal operation amount A exceeds the third accelerator operation threshold $A_{VH}$, the target clearance may be set to the extended state regardless of the value of the vehicle speed V. The third accelerator operation threshold $A_{VH}$ is stored in the storage unit, and is read by the clearance determination section 26A any time to be used for determination.

Figure 12:
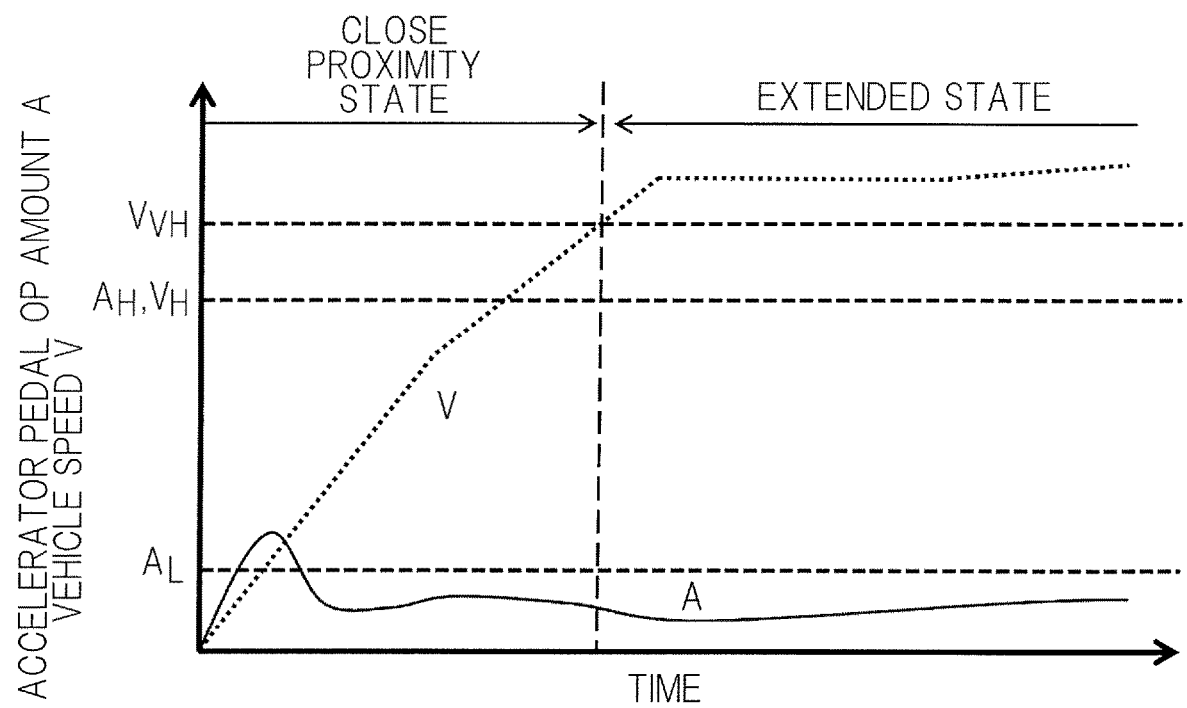
FIG. 12 is a diagram showing examples of transitions of an accelerator pedal operation amount and a vehicle speed, other than those shown in FIG. 11.

As shown in FIG. 12, on a steep descent where acceleration is continued even if the accelerator pedal operation amount A is less than the second accelerator operation threshold $A_L$, a vehicle speed not less than the cruising speed in the town is maintained while no accelerator operation is made. In this case, overheating of the brake due to dragging is concerned. Therefore, a second vehicle speed threshold $V_{VH}$ greater than the first vehicle speed threshold $V_H$ is set, and when the vehicle speed V exceeds the second vehicle speed threshold $V_{VH}$ even if the accelerator pedal operation amount A is less than the second accelerator operation threshold $A_L$, the target clearance may be set to the extended state and maintained in this state. The second vehicle speed threshold $V_{VH}$ is also stored in the storage unit 66, and is read by the clearance determination section 26A any time to be used for determination.

Figure 13:
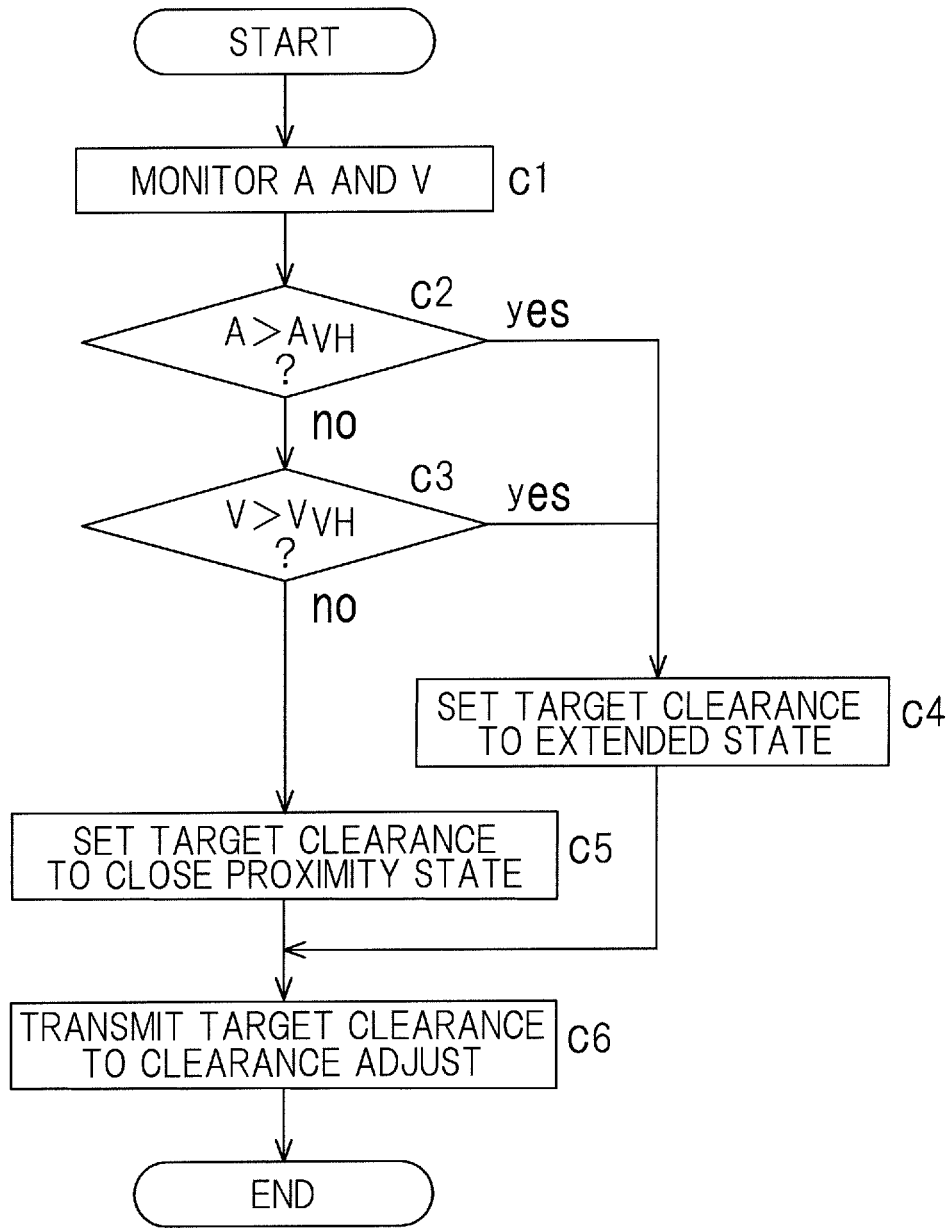
FIG. 13 is a flowchart showing an operation, for determination regarding clearance open, of the electric brake device according to the second variant.

FIG. 13 is a flowchart showing an operation for determining "clearance open" in the electric brake device. After the operation is started, the monitoring module 64 monitors the accelerator pedal operation amount A and the vehicle speed V (step c1). When the accelerator pedal operation amount A exceeds the third accelerator operation threshold $A_{VH}$ (yes in step c2), the clearance determination section 26A sets the target clearance to the extended state (step c4). Even if the accelerator pedal operation amount A remains less than or equal to the third accelerator operation threshold $A_{VH}$ (no in step c2), when the vehicle speed V exceeds the second vehicle speed threshold $V_{VH}$ (yes in step c3), the clearance determination section 26A goes to step c4 where the target clearance is set to the extended state. Thereafter, the process proceeds to step c6.

If the vehicle speed V remains less than or equal to the second vehicle speed threshold $V_{VH}$ (no in step c3), the clearance determination section 26A sets the target clearance to the close proximity state (step c5). Thereafter, in step c6, the clearance determination section 26A transmits the determined target clearance to the clearance adjustment unit 30A. Thereafter, this process is ended.

The following modes are conceivable as modes of the variants of the present invention described above.

[Mode 1]

An electric brake device comprising:

a rotational member;

a friction member to be brought into contact with the rotational member;

a friction member operating mechanism configured to generate a braking force by bringing the friction member into contact with the rotational member;

an electric motor configured to drive the friction member operating mechanism; and a controller configured to control the electric motor so as to adjust a clearance between the rotational member and the friction member, a vehicle equipped with the electric brake device, including:

a vehicle speed detector configured to detect a vehicle speed;

an accelerator operation amount detector configured to detect an accelerator operation amount of an accelerator operation member; and a brake operation amount detector configured to detect a brake operation amount of a brake operation member, wherein the controller includes:

a monitoring module configured to monitor a vehicle speed detected by the vehicle speed detector and an accelerator operation amount detected by the accelerator operation amount detector, in a brake non-operated state where a brake operation amount of the brake operation member is not detected by the brake operation amount detector; and a clearance change module configured to change the clearance when one or both of the vehicle speed and the accelerator operation amount being monitored by the monitoring module satisfy set conditions.

The set conditions are predetermined based on the result of a test, simulation, or the like.

According to Mode 1, in the brake non-operated state, the monitoring module monitors the vehicle speed detected by the vehicle speed detector and the accelerator operation amount detected by the accelerator operation amount detector. The clearance change module changes the clearance when one or both of the vehicle speed and the accelerator operation amount being monitored satisfy the set conditions. When a driver has clear intention of accelerating and during cruising after the acceleration, the driver should operate the accelerator operation member relatively strongly to increase the vehicle speed, and thereafter, should make an input of an accelerator operation amount not less than a certain level while increasing and decreasing the vehicle speed to some extent.

In the brake non-operated state, if the sign as described above is seen from the vehicle speed or the accelerator operation amount being monitored, the clearance is changed. In the case where the vehicle speed increases, even when the clearance is changed, the driver is less likely to mind noise caused by the clearance change because there is road noise, that is, the level of noise around the vehicle increases. Also in the case where there is an input of the accelerator pedal operation amount not less than the certain level, the driver is less likely to mind the noise caused by the clearance change, because of noises of the engine and the motor caused by the acceleration of the vehicle. Therefore, while there is no operation on the brake operation member, the clearance can be adjusted without making the driver feel discomfort.

In view of electric mileage, protection of components, and reduction of discomfort, the occurrence of dragging torque due to contact of a rotational member (brake disc) and a friction member (brake pad) during traveling of the vehicle should be inhibited. In particular, dragging is not necessary at acceleration or during cruising, and dragging during cruising for long hours may cause overheating of the brake.

On the other hand, when braking is started, noise and steep rising of braking torque, which are generated when the clearance is eliminated to bring the brake pad into contact with the brake disc, are likely to cause problems. Also, in order to improve response performance, the clearance needs to be set narrow, and needs to be set to a value with dragging if necessary. Although it is desirable to maintain a sufficiently narrow clearance without dragging, it is difficult to realize such a clearance because it is difficult to maintain the brake pad at a neutral position, and the electric brake actuator has different properties between under increasing pressure and under decreasing pressure. Therefore, the clearance is not eliminated but is maintained at a value other than zero during traveling, and the clearance is eliminated at braking, thereby improving response performance.

[Mode 2]

The electric brake device according to Mode 1, wherein the clearance change module includes:

a target clearance determination unit configured to determine a target clearance as a target value of the clearance; and a clearance adjustment section configured to adjust an actual clearance so as to coincide with the target clearance determined by the target clearance determination unit.

In the case of Mode 2, after the target clearance determination unit determines the target clearance, the clearance adjustment section adjusts the actual clearance so as to coincide with the determined target clearance, whereby a desired clearance can be achieved.

[Mode 3]

The electric brake device according to Mode 2, wherein the target clearance determination unit includes a first clearance determination section configured to set the target clearance to an extended state larger than a predetermined close proximity state, when the accelerator operation amount monitored by the monitoring module exceeds a first accelerator operation threshold $A_H$.

The first accelerator operation threshold $A_H$, the close proximity state, and the extended state are predetermined based on the result of a test, simulation, or the like. When the accelerator operation amount exceeds the first accelerator operation threshold $A_H$, the set condition regarding the accelerator operation amount is satisfied.

According to this configuration, for example, a value smaller than the accelerator operation amount that is often used for acceleration after signal stop is used as the first accelerator operation threshold $A_H$ used for extension of the target clearance. When the monitored accelerator operation amount exceeds the first accelerator operation threshold $A_H$, the clearance determination section sets the target clearance to the extended state, whereby dragging between the rotational member and the friction member can be reduced. Thus, mileage of the vehicle can be improved.

[Mode 4]

The electric brake device according to mode 3, wherein the target clearance determination unit includes a second clearance determination section configured to set the target clearance to a close proximity state smaller than the extended state, when the accelerator operation amount monitored by the monitoring module becomes lower than the second accelerator operation threshold $A_L$.

The second accelerator operation threshold $A_L$ is predetermined based on the result of a test, simulation, or the like.

In this case, when the monitored accelerator operation amount becomes lower than the second accelerator operation threshold $A_L$, the clearance determination section reduces the target clearance to the close proximity state, in preparation for braking. Thus, response performance can be improved.

[Mode 5]

The electric brake device according to Mode 4, wherein the target clearance determination unit provides a difference between the first accelerator operation threshold $A_H$ and the second accelerator operation threshold $A_L$, to make the period during which the clearance is maintained in the extended state longer than the period during which the clearance is maintained in the close proximity state.

The "difference" between the first accelerator operation threshold $A_H$ and the second accelerator operation threshold $A_L$ is a relatively large difference that can prevent hunting in which the target clearance is switched between the close proximity state and the extended state many times in a short time, by neglecting minute increase/decrease in the accelerator operation amount for minutely adjusting the vehicle speed, while securing the accelerator operation amount to prevent excessive reduction in the vehicle speed, which is often performed when the vehicle is cruising. This difference is predetermined based on the result of a test, simulation, or the like.

[Mode 6]

The electric brake device according to any one of Mode 2 to Mode 5, wherein target clearance determination unit includes a third clearance determination section configured to set the target clearance to an extended state larger than a predetermined close proximity state, when the vehicle speed monitored by the monitoring module exceeds the first vehicle speed threshold $V_H$, and the monitored accelerator operation amount exceeds the first accelerator operation threshold $A_H$.

REFERENCE NUMERALS

2 . . . controller
4 . . . electric motor
6 . . . linear motion mechanism (friction member operating mechanism)
8 . . . brake rotor (rotational member)
9 . . . friction member
17 . . . target clearance determination unit
19 . . . operation record flag storage unit
24 . . . brake operation amount detector
27 . . . brake operation member

What is claimed is:

1. An electric brake device comprising:
a rotational member;
a friction member to be brought into contact with the rotational member;
a friction member operating mechanism configured to generate a braking force by bringing the friction member into contact with the rotational member;
an electric motor configured to drive the friction member operating mechanism; and
a controller configured to control the electric motor so as to adjust a clearance between the rotational member and the friction member, wherein
the controller includes:
a brake operation amount detector configured to detect an operation amount to a brake operation member of a vehicle equipped with the electric brake device;
an operation record flag storage unit configured to store an operation record flag indicating a record of a latest operation performed by a driver to the brake operation member, on the basis of the operation amount detected by the brake operation amount detector;
a target clearance determination unit configured to determine a target clearance is greater than zero to place the friction member at a stand-by location when the operation flag is set to "OFF" indicating a non-contact state where the friction member is not in contact with the rotational member and to determine the target clearance is zero to place the friction member at a contact location when the operation flag is set to "ON" indicating a contact state where the friction member is in contact with the rotational member; and
a pressing command unit including a clearance adjustment section configured to adjust an actual clearance to the determined target clearance when the pressing command unit determines no operation is being applied to the brake operation member based on the operation amount detected by the brake operation amount detector.

2. The electric brake device as claimed in claim 1, wherein
the pressing command unit is configured to determine a command value of a pressing force that causes the braking force, and
the pressing command unit further includes:
a pressing force generation section configured to generate the command value of the pressing force in accordance with the operation amount detected by the brake operation amount detector, during the brake operation member being operated.

3. The electric brake device as claimed in claim 1, wherein
the controller includes:
a vehicle stop detector configured to detect whether or not the vehicle is at a stop; and
an accelerator operation detector configured to detect whether or not an accelerator operation member in the vehicle is being operated, and
the target clearance determination unit determines the target clearance on the basis of: whether or not the vehicle is at a stop, which is detected by the vehicle stop detector; whether or not the accelerator operation member is being operated, which is detected by the accelerator operation detector; and the operation record flag stored in the operation record flag storage unit to be read.

4. The electric brake device as claimed in claim 3, wherein
during no operation being applied to the brake operation member, when the accelerator operation detector detects that the accelerator operation member is not being operated, the vehicle stop detector detects that the vehicle is at a stop, and the operation record flag is "ON", the target clearance determination unit sets the target clearance to zero to maintain the contact state between the rotational member and the friction member.

5. The electric brake device as claimed in claim 3, wherein during no operation being applied to the brake operation member, when the accelerator operation detector detects that the accelerator operation member is being operated, the target clearance determination unit sets the operation record flag to "OFF", to set the target clearance to a predetermined size other than zero.

6. The electric brake device as claimed in claim 3, wherein during no operation being applied to the brake operation member, when the vehicle stop detector detects that the vehicle is traveling, the target clearance determination unit sets the operation record flag to "OFF", to set the target clearance to a predetermined size other than zero.

7. The electric brake device as claimed in claim 3, wherein during no operation being applied to the brake operation member, when the accelerator operation detector detects that the accelerator operation member is not being operated, the target clearance determination unit sets the target clearance to a predetermined size other than zero when the operation record flag is "OFF".

\* \* \* \* \*